(12) United States Patent
Fritsch et al.

(10) Patent No.: US 9,356,472 B2
(45) Date of Patent: May 31, 2016

(54) SYSTEMS AND METHODS FOR REMOTELY CONTROLLING A WALL SOCKET

(71) Applicant: e5 Global Innovations, Inc., North Potomac, MD (US)

(72) Inventors: Darren Fritsch, Bethesda, MD (US); Brian Albert Wittman, Indianapolis, IN (US); James Edward McIntyre, Mooresville, IN (US); Austin Kirchhoff, Fishers, IN (US); James J. Hartmann, Fishers, IN (US); Jeff Seese, Waukee, IA (US)

(73) Assignee: e5 Global Innovations, Inc., North Potomac, MD (US)

( * ) Notice: Subject to any disclaimer, the term of this patent is extended or adjusted under 35 U.S.C. 154(b) by 0 days.

(21) Appl. No.: 14/842,989

(22) Filed: Sep. 2, 2015

(65) Prior Publication Data
US 2016/0065004 A1 Mar. 3, 2016

Related U.S. Application Data

(60) Provisional application No. 62/044,572, filed on Sep. 2, 2014, provisional application No. 62/193,328, filed on Jul. 16, 2015.

(51) Int. Cl.
*H01F 27/42* (2006.01)
*H02J 13/00* (2006.01)
*H01H 9/54* (2006.01)

(52) U.S. Cl.
CPC ........... *H02J 13/0017* (2013.01); *H01H 9/54* (2013.01); *H01H 2300/032* (2013.01); *Y02B 70/3241* (2013.01); *Y04S 20/227* (2013.01)

(58) Field of Classification Search
CPC . H02J 13/0017; H01H 9/54; H01H 2300/032; Y02B 70/3241; Y04S 20/227
See application file for complete search history.

(56) References Cited

U.S. PATENT DOCUMENTS

| | | | |
|---|---|---|---|
| 4,309,582 A | 1/1982 | Coors | |
| 5,239,205 A * | 8/1993 | Hoffman | H01H 23/00 200/277.2 |
| 5,895,985 A | 4/1999 | Fischer | |
| 5,905,442 A * | 5/1999 | Mosebrook | G05B 19/0423 307/31 |
| 5,959,557 A | 9/1999 | Lim | |
| 6,771,182 B1 | 8/2004 | Loh et al. | |
| 7,633,076 B2 | 12/2009 | Huppi et al. | |
| 7,667,616 B2 | 2/2010 | Fair et al. | |
| 2013/0189925 A1 | 7/2013 | Staskawicz et al. | |

FOREIGN PATENT DOCUMENTS

| | | | |
|---|---|---|---|
| WO | WO 9849699 A1 * | 11/1998 | .......... H02J 13/0048 |
| WO | WO03/096761 A1 | 11/2003 | |

OTHER PUBLICATIONS

International Search Report and Written Opinion for PCT Patent App. No. PCT/US15/48031 (Dec. 4, 2015).

* cited by examiner

*Primary Examiner* — Daniel Cavallari
(74) *Attorney, Agent, or Firm* — Adam J. Cermak; Cermak Nakajima & McGowan LLP

(57) ABSTRACT

A system permits wirelessly controlling the duty cycle of alternating current at a wall electrical outlet (152) remote from a wall electrical outlet (144) which is controlled by a wall switch (142).

10 Claims, 12 Drawing Sheets

SYSTEMS AND METHODS FOR REMOTELY CONTROLLING A WALL SOCKET

BACKGROUND

1. Field of Endeavor

The present invention relates to devices, systems, and processes useful as remote power outlet controllers, and more specifically to controllers usable with two-state and dimmer switches.

2. Brief Description of the Related Art

Residential customers with homes wired with a power receptacle connected to a wall switch is common. The switched power receptacle, as described, is typically installed by a homebuilder utilizing a line voltage wall switch to energize and de-energize a single or double power outlet elsewhere in a room. This typically affords the homeowner the option to connect a light or appliance to the switched outlet and have the capability of turning the appliance on and off via the wall switch; this is similar to the overhead lights in a room.

A majority of the time, the switched outlet may not be in a useful location within the room and the switched outlet is thereby not utilized for its intended function.

Prior devices have been proposed to remotely, including wirelessly, control the on-off state of a wall power outlet, from a wall outlet that is directly controlled by a wall switch. For example, U.S. Pat. Nos. 5,895,985 and 7,375,445 describe some of these prior proposals.

Prior systems are not, however, expandable in their control by pairing additional receivers to a single transmitter in order to control multiple devices from a single wall switch, and therefore there remains a need for systems and methods which permit control, from a first wall power outlet the state of which is controlled by a wall switch, of a second or more wall power outlets remote from the first wall power outlet. Therefore, there remains a need for improvements in this area.

SUMMARY

According to a first aspect of the invention, a system useful for remotely controlling an alternating current across at least two electrical terminals comprises a transmitting unit including an alternating current detector configured to be electrically connected to a source of alternating current, the alternating current detector including a signal output, a controller having an external interrupt in communication with the signal output of the alternating current detector, and a data output, wherein the controller is configured to determine a duty cycle of a signal from said signal output of the alternating current detector and generate a signal representative thereof to said data output, and an RF transmitter in communication with the controller data output, the RF transmitter being configured to wirelessly transmit data representative of the signal representative of the duty cycle; and a receiving unit including an electrical connector inlet configured to be connected to a wall outlet of alternating current, an alternating current control in electrical communication with said electrical connector inlet and including a signal inlet and at least one pole of a controlled alternating current outlet, a controller having a control signal output in signal communication with the alternating current control signal inlet, the controller including a data inlet; an RF receiver having an outlet in signal communication with the controller data inlet, the RF receiver configured to receive data from the RF transmitter representative of duty cycle, wherein the controller is configured to generate a signal representative of duty cycle data received from the RF receiver, and to output said signal to said controller control signal output, and wherein the alternating current control is configured to change the duty cycle of alternating current across said electrical connector outlet based on the signal at said signal inlet from said controller.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1A:
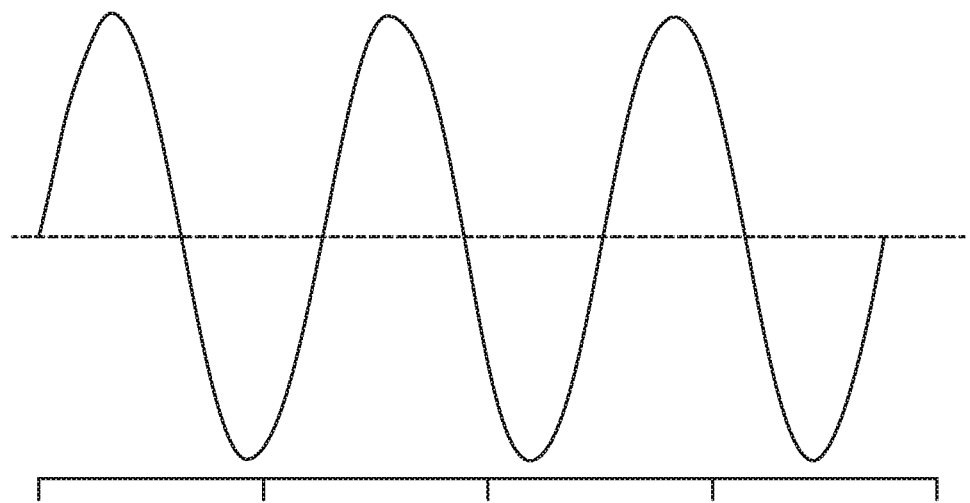
FIGS. 1A and 1B illustrate graphs of "undimmed" alternating current and "dimmed" alternating current, respectively.

Referring to the drawing figures, like reference numerals designate identical or corresponding elements throughout the several figures.

The singular forms "a," "an," and "the" include plural referents unless the context clearly dictates otherwise. Thus, for example, reference to "a solvent" includes reference to one or more of such solvents, and reference to "the dispersant" includes reference to one or more of such dispersants.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a range of 1 to 5 should be interpreted to include not only the explicitly recited limits of 1 and 5, but also to include individual values such as 2, 2.7, 3.6, 4.2, and sub-ranges such as 1-2.5, 1.8-3.2, 2.6-4.9, etc. This interpretation should apply regardless of the breadth of the range or the characteristic being described, and also applies to open-ended ranges reciting only one end point, such as "greater than 25," or "less than 10."

One of numerous aspects of the systems and processes described herein includes providing to, e.g., the homeowner the ability to utilize an otherwise unused or inconveniently located switched receptacle by way of a simple transmitter and receiver pair to extend the function of the wall switch anywhere in the room or within range of the transmitter. In general terms, the transmitter and receiver pair will utilize a basic digital wireless communication protocol to index when the switched power outlet is energized and, conversely, de-energized via the wall switch. At such time, the transmitter will convey an 'on' or 'off' signal to the receiver plugged in elsewhere in the room. The appliance connected to the receiver will be energized and de-energized, respectively, based on the data wirelessly received from the transmitter. Additionally, for applications where the wall switch connected to the outlet utilizes a dimmable switch, the transmitter will have the capability to interpret and transmit the dimmable status to the receiver and index the receiver to subsequently dim the connected appliance accordingly.

FIG. 1 of U.S. Pat. No. 5,895,985 illustrates the general environment of the present invention, which includes a transmitter 14 and a receiver 15 and which forms an integral part of the present disclosure.

Figure 1B:
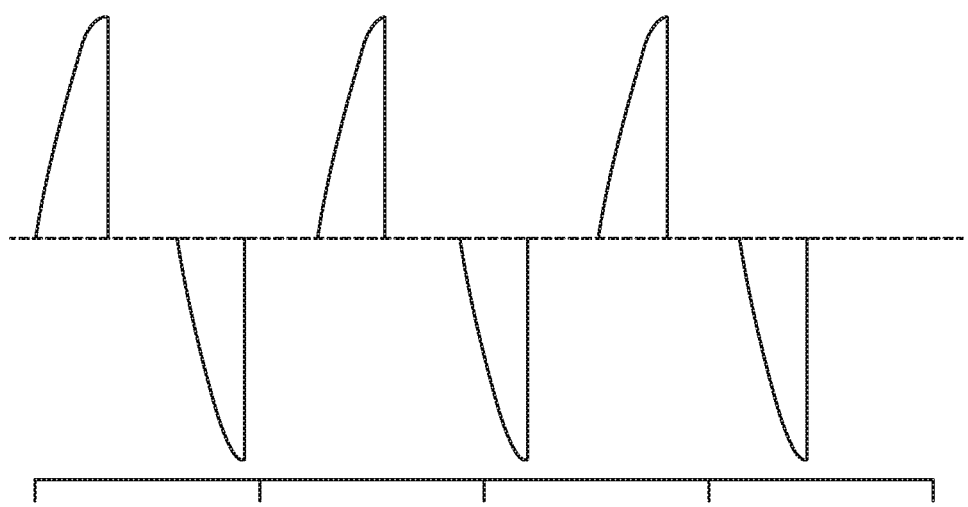

FIG. 1A of the drawings of this application illustrates a 100% duty cycle AC sine wave, which is what is normally available at a wall outlet when in an 'on' condition. FIG. 1B illustrates a similar voltage-time plot, but for a commonly commercially available dimmer switch set at 50%, and shows that a dimmer switch will shut off (i.e., produce zero voltage) for a portion of the sine wave to produce the dimming effect.

Figure 2:
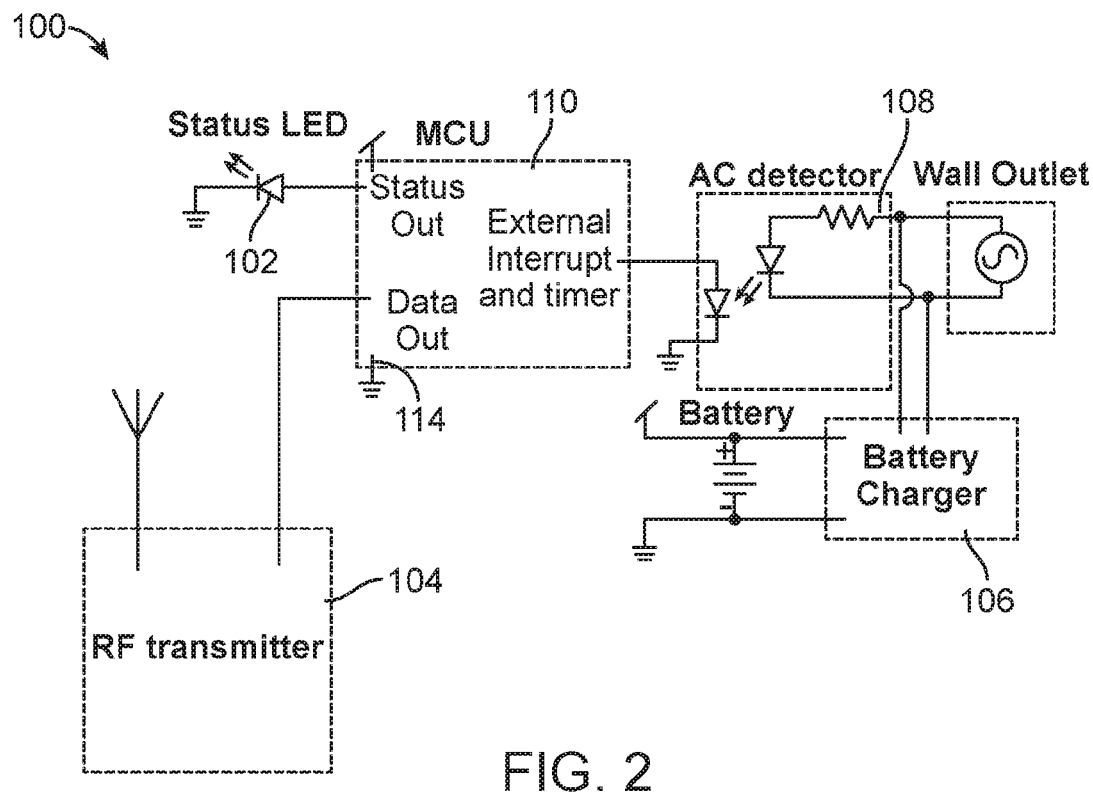
FIG. 2 illustrates an exemplary embodiment of a wireless transmitter.

An exemplary transmitter unit 100, an embodiment of which is schematically illustrated in FIG. 2, is plugged into a switched power outlet. The transmitter unit has a standard 120 volt (in the U.S.; other voltages as are standard in other countries) male plug configuration affixed to the back of unit. The front of the unit optionally includes one or more standard (e.g., 120 volt) female plug configurations for the additional flexibility to plug in another appliance for use with the switched receptacle. Additionally, an LED (for example) status light 102 will also be visible from the front of the unit, denoting the power status of the transmitter unit.

The transmitter unit 100 includes a wireless transmitting device 104 to send a digital transmission status signal when the outlet is energized and de-energized. According to one exemplary embodiment, the transmitter is not intended to operate when the power is de-energized; however, a rechargeable battery 106 integral to the unit instantaneously transmits to the receiver unit when the switched receptacle is energized. According to another, more preferred embodiment, the electronics include an RCD circuit (Resistor, Capacitor, Diode) for near-instantaneous operation (200 ms or less) when the unit is energized (described in greater detail below). Conversely, the unit can retain a charge when de-energized (i.e., when line power is disconnected) long enough to send another signal, stating the unit is de-energized (e.g., approximately 63 ms). A battery in this embodiment is therefore no longer required and, thus, the unit is smaller and more cost effective. The transmitter unit includes an AC detector 108, which can be formed by a paired set of LEDs, and an MCU 110. An external interrupt and timer input 112 of the MCU receives input from the receiver of the two LEDs, and the MCU's status output is optionally led to the status LED 102. A data out output 114 of the MCU is provided to the RF transmitter 104.

Figure 3:
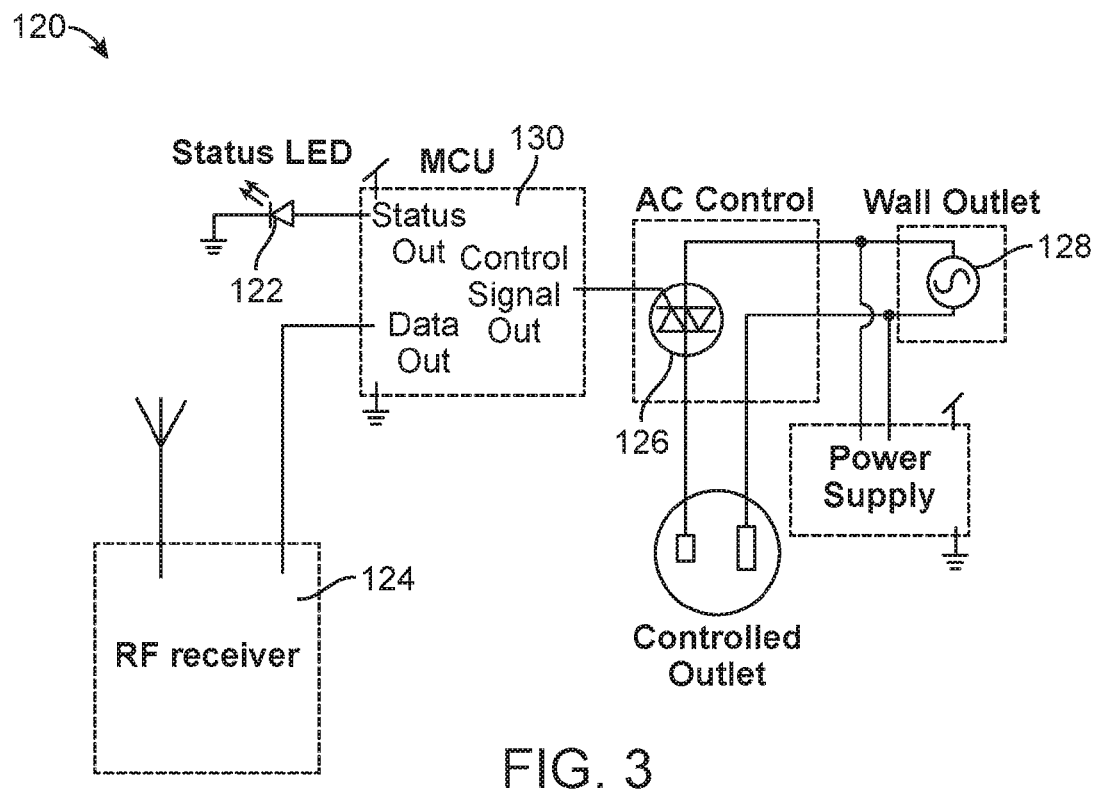
FIG. 3 illustrates an exemplary embodiment of a wireless receiver.

The receiver unit 120, an exemplary embodiment of which is illustrated in FIG. 3, which is plugged into any normally powered outlet, has a standard, e.g., (in the U.S.; other voltages as are standard in other countries) 120 volt male plug configuration affixed to the back of unit. The side of the unit includes a standard (e.g., 120 volt) female plug configuration for an intended appliance connection, as well as an LED (for example) status light 122 to denote power status. The receiver unit 120 includes a wireless receiving device 124 to accept a digital transmission status signal to index a 120 volt, 15 amp relay 126. The receiver unit 120 is intended to be connected to a continually energized outlet 128 and thus, will not require batteries.

Since systems as described herein are intended to be scalable, ways of differentiating each receiver unit are advantageously employed. By way of example, the receiver(s) include a transmitter's identifier (ID) when paired. This ID is used in all communications between the devices. All messages containing a different ID are thus ignored. The Transmitter's unique ID can be, by way of a non-limiting example, 4 bytes long, which allows up to 4 billion unique ID's. For example, this aspect is incorporated and allows the connection of multiple receivers to a single transmitter or, alternatively, multiple transmitter/receiver pairs within the same home or close proximity. Another, less preferred, yet also usable, embodiment incorporates dipswitch differentiating, which is well-known to those of ordinary skill in the art.

Advantageously, systems as described herein are to be compatible at a future time with other centralized digital transmission signals from in-home networks. The receiver PLC is optionally designed to be easily upgradable and addressable via software download for greater system integration.

The wireless communication is advantageously a Radio Frequency (RF) signal within the public communication spectrum. In simplified embodiments, the system utilizes a basic transmitter for sending only commands and a receiver to accept commands from only the paired transmitter via a discrete communication signal, similar to a garage door controller and garage door opener. The transmitter and receiver devices thus incorporate devices to 'pair' multiple receivers to a single transmitter, e.g., via a micro-USB cable, or, more preferably, an Infrared emitter and receiver such that, when the two are in close proximity, and after an initial power synchronization, the devices can pair automatically.

In preferred embodiments described herein, neither the transmitter unit nor receiver unit will require a battery. The receiver unit can utilize an electro-mechanical relay to energize and de-energize the connected device. The electro-mechanical relay inherently has low power dissipation and is insensitive to transients, and will efficiently sustain a 15 amps, 120 VAC maximum load.

Again with specific reference to FIG. 2, an exemplary RF Transmitter is schematically illustrated. Because the programming and use of microcontroller units is well known to those of ordinary skill in the art, the specific instructions are not included herein. The RF transmitter can be powered by a rechargeable battery 106, or more preferably, an RCD circuit so that it can instantly respond to an AC detection when the wall outlet is turned on. AC current (see FIGS. 1A, 1B), flowing through the opto-coupler, triggers an external interrupt on the microcontroller unit (MCU) and also charges the battery.

A trigger on the MCU 110 interrupt starts a sequence that counts the "on" duration of the AC signal to determine the duty cycle, if there is a dimmer switch controlling the outlet. When a subsequent zero crossing is detected, the duty cycle is calculated. The MCU then sends data to the RF transmitter 104 containing a unique ID for that transmitter and data representative of the duty cycle. If the duty cycle is greater than zero, the status LED 102 output is turned on. The MCU constantly monitors the duty cycle looking for any change in the duty cycle or for the AC signal to be off Any change in duty cycle, or an "off" signal, are transmitted. If a duty cycle of zero is detected, then a zero duty cycle is transmitted and the status LED 102 is turned off. Also, when a duty cycle of zero is detected, the MCU goes into a low power 'sleep mode' waiting for the next AC detect trigger on the external interrupt.

With further specific reference to FIG. 3, the exemplary RF Receiver 120 is schematically illustrated. The RF receiver 120 sends all data received from the transmitter unit 104 to the MCU 130 of the receiver unit. The MCU 130 first determines if the unique ID for the transmitter is valid, based on data previously stored in the MCU. If the unique ID is not valid, the data is ignored. If the unique ID is valid, the MCU controls the solid state relay (SSR) 126 to match the transmitted duty cycle received from the transmitter unit, which results in the duty cycle of the output current of the receiver unit matching that sensed by the transmitter unit. If the duty cycle is greater than zero, the status LED 122 is turned on. If the duty cycle is zero, the status LED 122 is turned off and the SSR gate signal is disabled.

Preferred, and yet still exemplary, embodiments include MCUs that are currently commercially available, including the ATMEL (San Jose, Calif.) series of ATiny85, ATtiny84, and ATmega328 models, although others, e.g., PICs and others can also be used. Similarly, any properly rated SSR is useable, including, but not limited to, a Digi-Key (Thief River Falls, Minn.) model 646-1256-ND.

Figure 4:
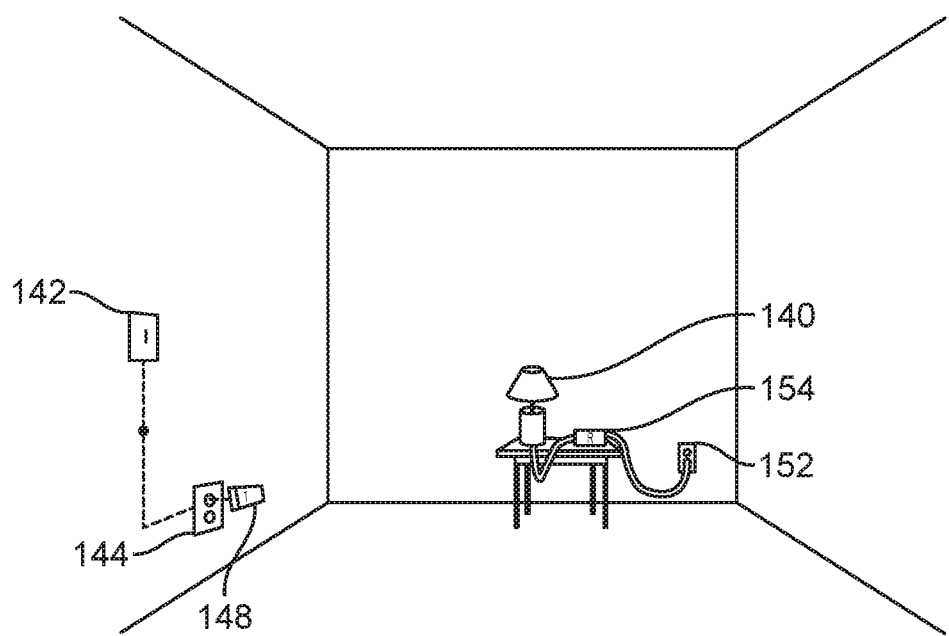
FIG. 4 illustrates another exemplary embodiment of a wireless system
Figure 5:
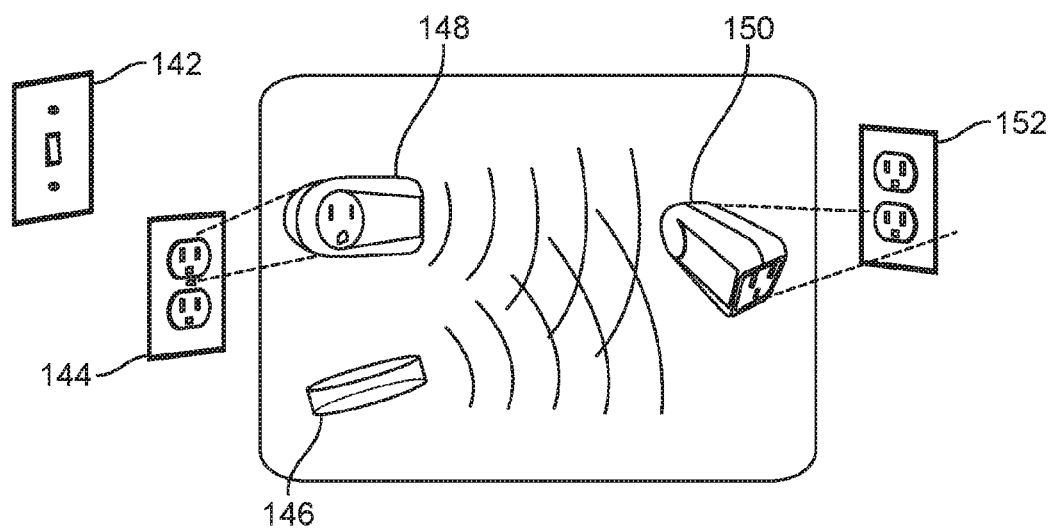
FIG. 5 illustrates an exemplary three-way system.

FIG. 4 illustrates aspects of yet another exemplary embodiment, one which can provide the ability to utilize the existing wall switch 142 controlling an electrically connected, switched receptacle 144, in conjunction with an additional mechanical pressure switch/Receiver 154 located anywhere in the room, to control a connected light appliance 140 like a three-way switch. In one embodiment, the system utilizes a wireless remote 146 (described elsewhere herein) to work with a transmitter 148 and receiver pair as an additional switch for that system. The wireless remote 146 can be paired either at the factory or purchased separately and paired by the user. This allows the two-way operation of the transmitter and receiver to become a three-way operation with the transmitter, receiver, and wireless remote. The receiver's microcontroller is pre-programmed to accept an 'energized' or 'de-energized' command from the transmitter. When a wireless remote is paired to the system, the receiver's microcontroller interprets the wireless remote's signal as 'Invert' or 'Revert', depending on the last transmitter command. This ensures the last position during a power outage and self-corrects with any missed transmissions.

An example of this application is to turn 'on' a bedside light 140 via the wall switch 142 connected to a switched outlet 144 when entering the bedroom and then, once in bed, activate or depress the wireless remote 146 to turn the connected load, e.g., light, off. Conversely, the light may be turned on by activating or depressing the button on the wireless remote 146 and then turn off the, e.g., light appliance via the wall switch 142 connected to a switched outlet 144 when leaving the room.

Many features of the embodiment of FIG. 4 are the same as or similar to those of other embodiments described herein, and will therefore not be further described. With reference to FIGS. 5-13, FIG. 5 illustrates an embodiment in which a switched outlet utilizes a simple transmitter to extend the function of the wall switch anywhere in the room or within range of the transmitter. A wireless remote 146 communicates with the receiver 150 and energizes and de-energizes the attached load, e.g., light appliance, connected to the receiver. The receiver 150 is connected to an adjacent power outlet 152 for AC power, and is also equipped with a female AC plug to connect the desired appliance.

The receiver 150 will energize and de-energize the connected appliance based on an index from one of two sources: the wireless remote 146, or the wall switch connected to the switched power outlet with the transmitter 148. This will allow the wireless remote 146, receiver 150, and the transmitter 148 to work together, much like a hard-wired three-way switch in a home.

The transmitter 148, receiver 150, and wireless remote 146 utilize a basic digital wireless communication protocol to index when the switched power outlet 144 is energized and, conversely, de-energized. At such time, the transmitter 148 will convey a simple signal to change the status of the receiver 150 to either turn 'on' or 'off' the connected appliance 140 (regardless if the transmitter 148 is receiving line voltage or not). The appliance connected to the receiver 150 will thus be energized and de-energized, respectively. Alternatively, the wireless remote can have the capability to change the status of connected appliance 140 by depressing a manual switch on the wireless remote. This will act as the $2^{nd}$ switch in a three-way switch system.

The transmitter unit 148, which is plugged into the switched power outlet 144, is preferably a small, approximately 3" long×2" wide×1" deep unit with a standard 120-volt male plug configuration affixed to, or extending from, the back of unit. The front of the unit includes a standard 120-volt female plug configuration for additional flexibility to plug in another appliance for use with the switched receptacle. Additionally, an LED status light will also be visible from the front of the unit denoting power status.

The transmitter 148 includes a wireless transmitting device to send a digital transmission status signal when the outlet is energized and de-energized.

The receiver 150 includes a wireless receiving device to accept a digital transmission signal to index the controller to modulate a 120-volt, e.g., 15-amp relay. The receiver is connected to a continually energized AC receptacle and, thus, will not require batteries.

Figure 6:
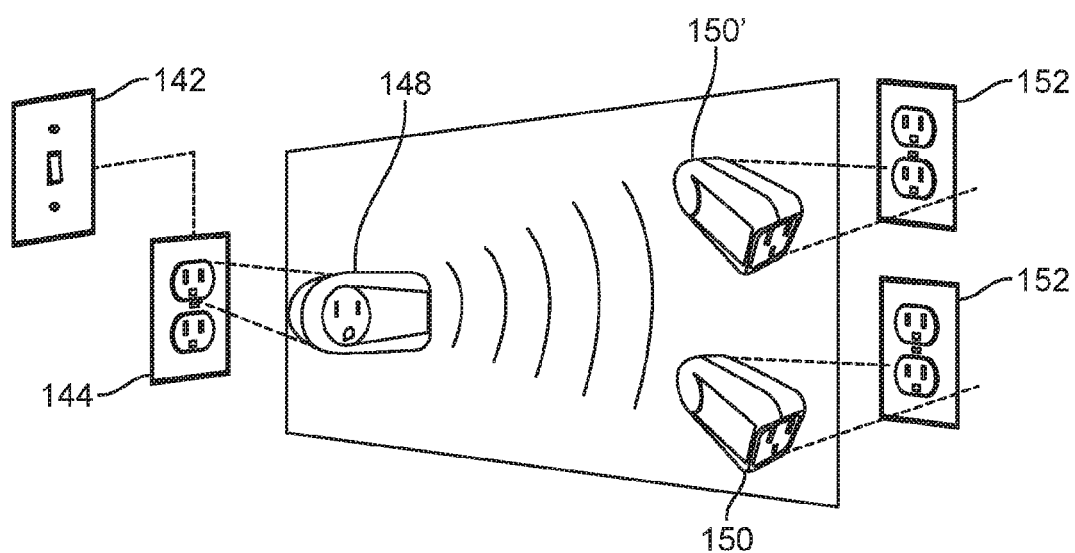
FIG. 6 illustrates an exemplary paired, two-way system.

Additionally, the devices advantageously include a pairing procedure, which is encoded into the devices, to add additional receivers and a wireless remote to a transmitter. In a preferred embodiment, the process requires the user to remove the transmitter from power, connect the receiver into the transmitter by way of plugging the receiver male plug into the transmitter female plug on front of unit, energize the transmitter while the receiver is thus affixed, wait for an indicator, e.g., sound or LED lights to signal by way of blinking, and then remove from power. The receiver and transmitter are then disconnected from each other and the devices are then connected to respective AC power outlets. The wireless remote pairing is a similar process. The user will de-energize the transmitter from power (unplug from receptacle or turn off wall switch powering receptacle to which the transmitter is connected); while energizing power to the transmitter, the user holds down the button on the wireless remote until the LED signals by blinking, and then remove from power. The transmitter and receiver are then plugged into their respective power outlets and, once energized, the units will operate as a three-way switch. As illustrated in FIG. 6, the system can include multiple receivers 150, 150' that are paired with a single transmitter 148.

Figure 7:
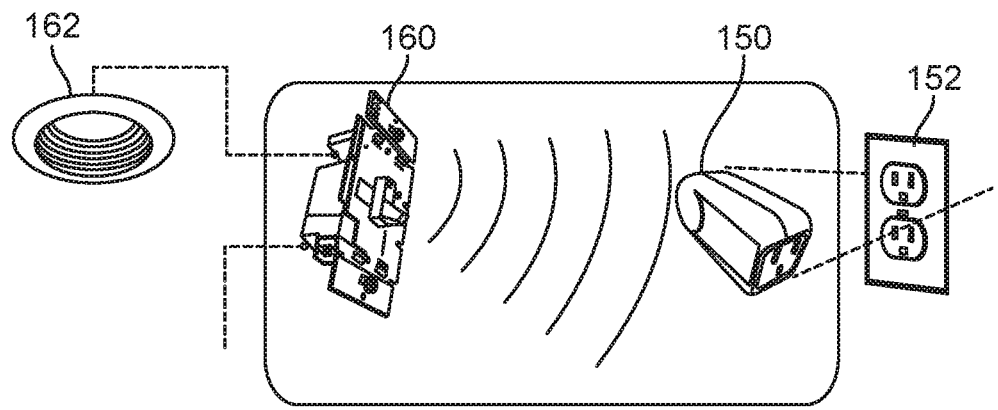
FIG. 7 illustrates an wall-switch implemented embodiment.

According to yet another advantageous embodiment, the system includes a wall switch assembly 160 that is intended to and can replace an existing, standard, hard-wired wall switch, as illustrated in FIG. 7. The wall switch 160 of the present invention will continue to operate as a two-way, hard-wired switch to control the state of a hard-wired load 162, but will also include electronics, similar to those described elsewhere herein, to send a digital signal to a receiver unit 150 elsewhere within the room. In this way, users have the ability to control another appliance (e.g., light, electronic, etc.) from an existing hard-wired room lighting system, in addition to the load 162 that is hard-wired to the switch 160. An example of such an application is to replace the standard light switch in a bathroom with a compound switch 160 of the present invention. The factory-paired receiver 150 is plugged into a wall outlet 152 adjacent to, e.g., the bathroom vanity. The user can plug an appliance, e.g., curling iron, into the receiver 150 and use it while the compound switch 160 of the present invention is turned on and the (hardwired) lights are on. When finished, the user turns off the lights 162 in the normal fashion, and the compound switch 160 transmits a signal to the receiver 150, which de-energizes the connected curling iron, thereby avoiding a potential overheating situation. This embodiment will utilize the same digital communication and receiver device consistent with the aforementioned devices.

Figure 8:
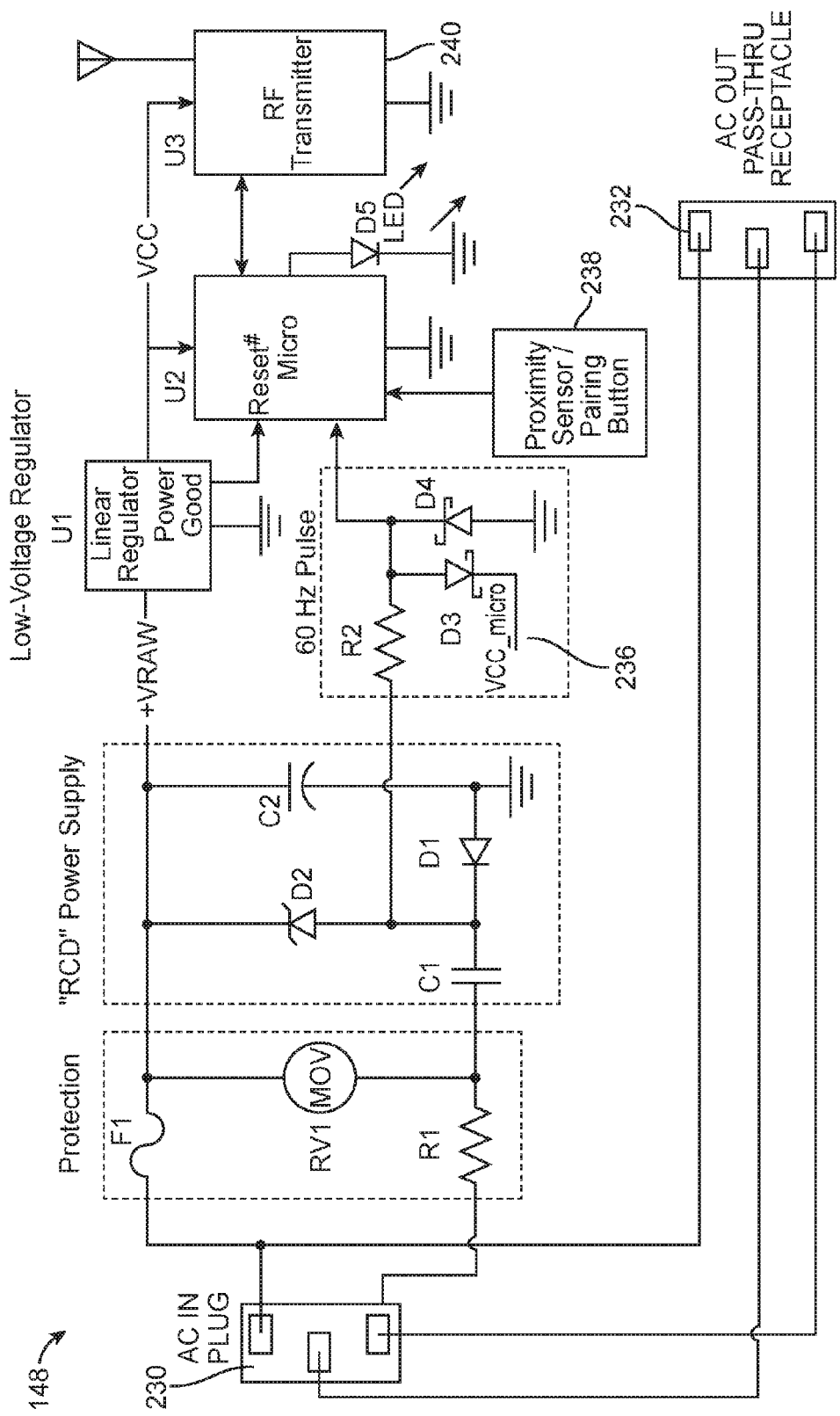
FIG. 8 illustrates an embodiment of a transmitter circuit.

Referring to FIG. 8, an exemplary circuit diagram for a transmitter 148, embodying principles of the present invention, is illustrated. Protection circuits include fuse F1, resistor R1, and MOV (metal oxide varistor) RV1. F1 may be required to pass UL (Underwriters Laboratories), but could possibly be eliminated if R1 is deemed sufficient by UL to provide fusing. The fuse F1 will open to prevent a fire if a component failure causes excessive current flow. RV1 is a MOV that protects downstream circuits from voltage surges due to lightning or voltage spikes generated by other loads in the home (motors, compressors, dimmers, etc.). The main purpose of R1 is to limit the current during lightning surges, which can be as high as 6 kV. Without R1 to limit the current, a lightning surge could cause F1 to blow open or RV1 to be destroyed.

Exemplary, non-limiting choices for these components are as follows:

F1: Littelfuse 37405000410, 500 mA slow blow fuse (UL listed/CSA certified)
R1: Yageo FMP200JR-52-47R, 47 ohm 2 W 5% flame-proof resistor
RV1: Panasonic ERZ-V14D241, 216V varistor, 14 mm The same protection components will be used for both transmitter 148 and receiver 150.

The simple power supply circuit RCD of FIG. 8, consisting of R1, C1, D1, D2, and C2, is a classic circuit that has been used many times in the past to create a low-voltage, low-power supply from the 120V AC mains, without resorting to a more expensive switching power supply solution. Most of the voltage is dropped across C1, which doesn't dissipate significant amounts of power because the current and voltage are out of phase in a capacitor. D2 is a zener diode which sets the maximum voltage for VRAW. C2 provides energy storage since the charge is injected only on positive cycles of the AC waveform.

Figure 11:
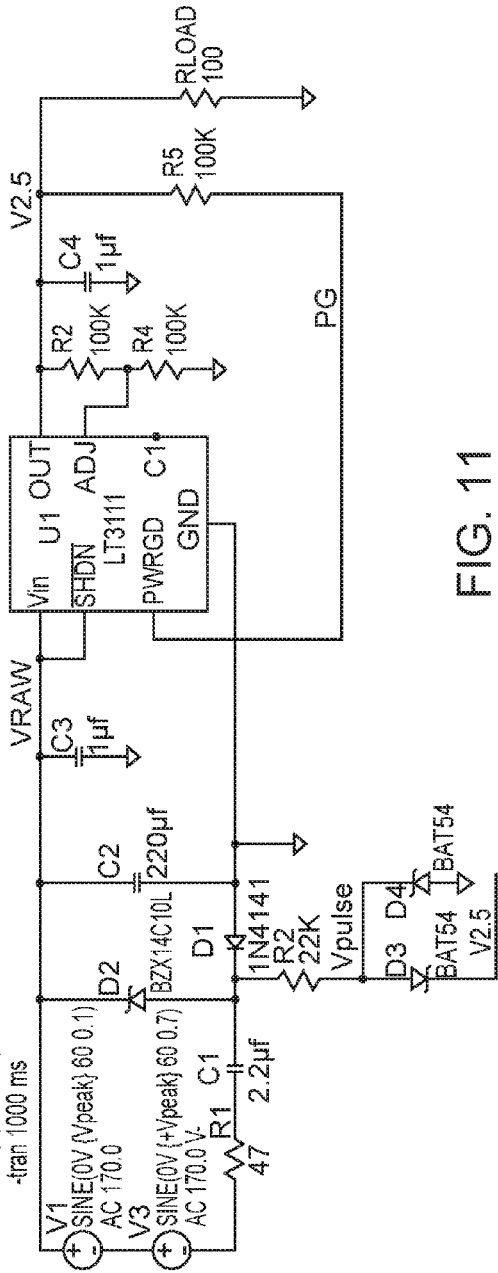
FIG. 11 illustrates a simulation of a circuit.
Figure 12:
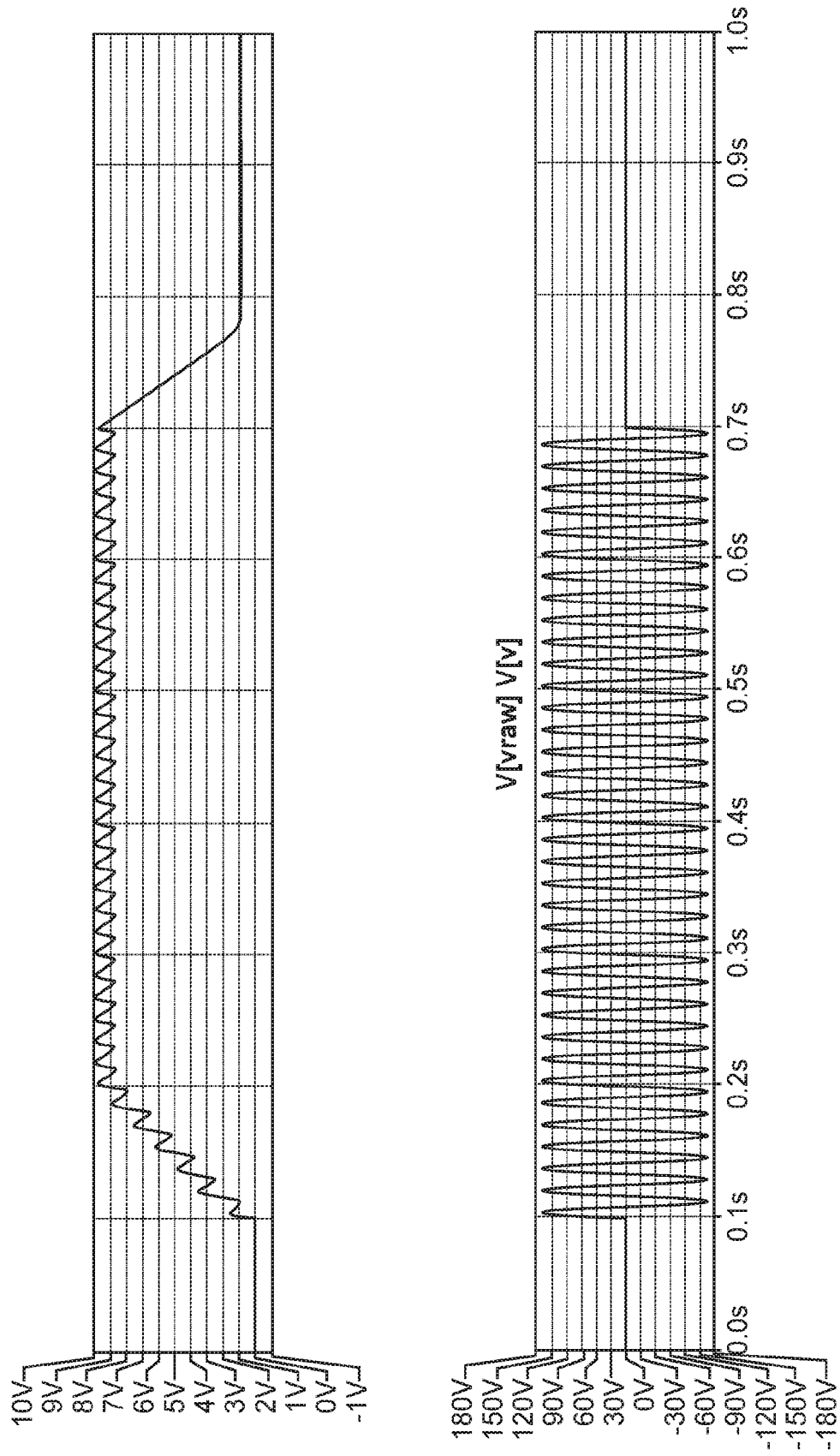
FIG. 12 illustrates waveform performance of the simulated circuit.
Figure 12:
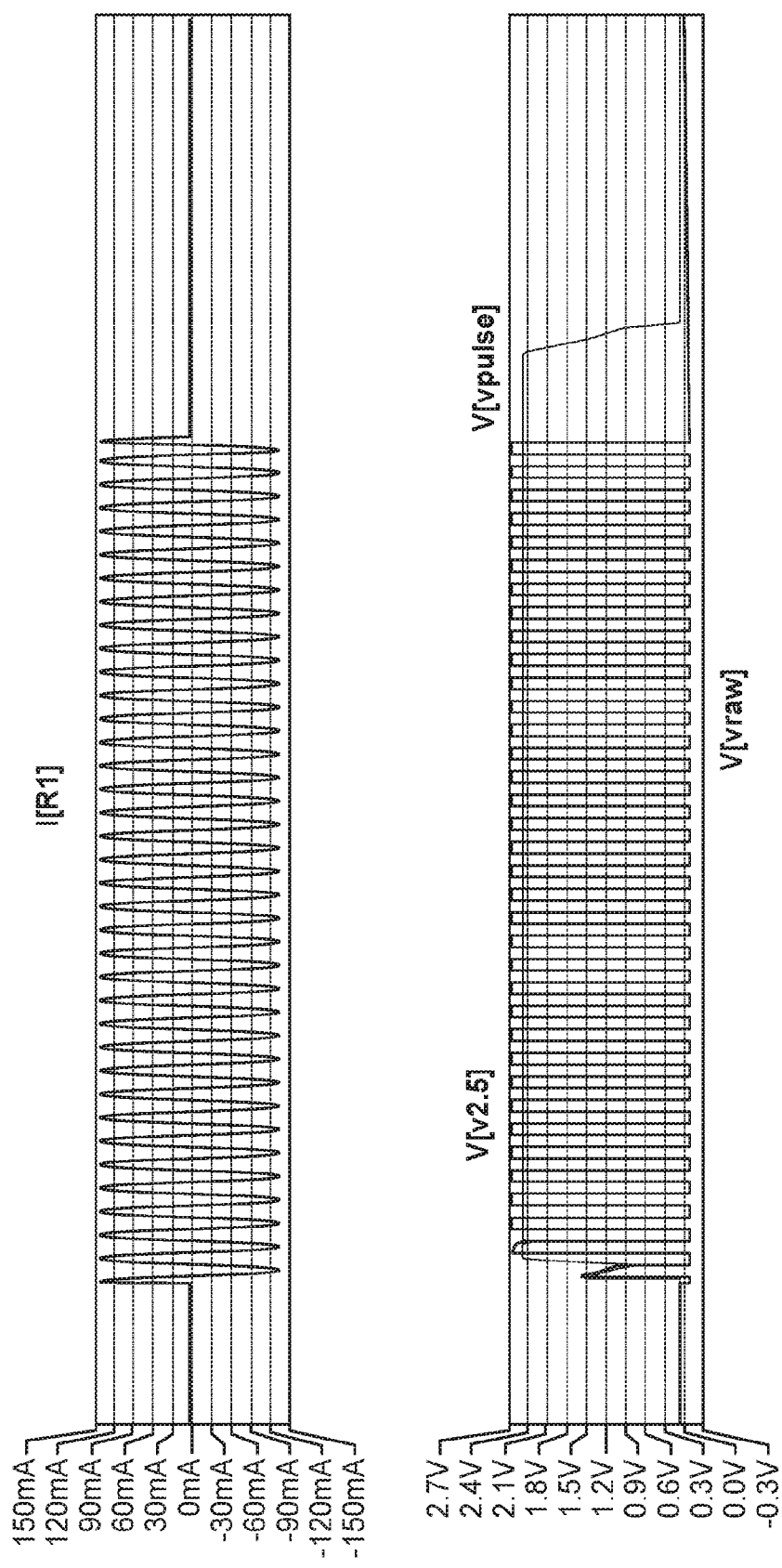

The schematic and waveforms for a PSPICE simulation of an exemplary transmitter implementation are illustrated in FIGS. 11 and 12, respectively (the fuse and MOV are not included in this simulation). Here, R1=47 ohms, C1=2.2 uf, D1=1N4148 diode, D2=10V zener, C2=220 uf. In this simulation, a 2.5V low-dropout (LDO) linear regulator is used to produce a 2.5V supply for the micro from VRAW. A 100 ohm resistor on +2.5V produces a constant 25 mA load current to simulate the current draw from the radio (which won't be constant). As can be seen, VRAW requires only 100 ms to come up to full value, although the +2.5V rail is up and stable within 40 ms of the onset of AC. Once AC goes away, the +2.5V rail stays up for only 63 ms after the last 60 Hz pulse. It is during this interval that the Transmitter sends an "off" message. Making C2 larger will yield a longer holdup time, but C2 becomes larger and more expensive, and the startup time also gets longer. In reality, C2 can probably be made smaller (e.g., 100 uf) since the load current will not be constant but will only be a few milliamps to power the micro, increasing to the 25 mA level only during transmission bursts. For this simulation, the current in R1 is approximately 100 mA rms, resulting in a power dissipation of 460 mW. (The resistor is rated at 2 W, so there is plenty of derating).

There are many LDO regulators to choose from, but one exemplary, and low-cost, choice is the Texas Instruments (Dallas, Tex.) LP2951CMX-3.0, which is a fixed 3.0V output regulator in an SOIC-8 package. This IC offers an input voltage range up to 30V, a maximum output current of 100 mA, and a typical dropout voltage of 380 mV at a 100 mA load current. Also provided is a Power Good output which can be used to reset the micro as shown in FIG. 8.

This simple low-cost circuit, shown in the schematic of FIG. 11, includes a resistor from the junction of D1 and D2, which connects to a pair of Schottky diodes connected respectively to VCC (e.g. +2.5V) and Ground. The resulting signal Vpulse, shown in FIG. 12, is a 60 Hz pulse train that goes 0.3V below ground and 0.3V above VCC. As shown in the simulation, these pulses are present even before the VCC power supply stabilizes. A BAT54S dual series-connected Schottky diode can be used for D1 and D2. Exemplary, non-limited choices for the electronic switch function include the following:

Electro-Mechanical Relay
TRIAC
MOSFETs

One important requirement is the maximum load current, combined with the need to limit heat dissipation inside a very small unvented plastic housing, which could be used to house the circuits. Assuming a maximum power dissipation of 2 watts in the electronic switch at the maximum specified load current of 15 A, then the maximum voltage drop is limited to 133 mV. If using two back-to-back MOSFETs, the maximum 'on' resistance ($R_{dson}$) in each must be less than 4.4 mΩ. A 15 A requirement effectively eliminates both TRIAC and MOSFET options. This is because a TRIAC typically has a voltage drop of about 1.5V, causing it to dissipate more than 2 watts at load currents above 1.3 A (corresponding to a 150 W load). N-channel MOSFETs rated at >250V are not available with such low $R_{dson}$ as 4.4 mΩ. MOSFETs rated at 250V and 300V are available with $R_{dson}$ in the 20 mΩ range, and this would limit the maximum current to about 7 A (corresponding to a maximum load of 850 W). Note that these transistors are quite expensive (currently, about $4 for two MOSFETs). So, in summary, the 15 A requirement, combined with the confined nature of the housing and the need to severely limit internal power dissipation, effectively eliminates both the TRIAC and MOSFET options.

The analysis above is consistent with an analysis of currently available products. One product that used a TRIAC for switching was rated only for 150 W. The other two products contained relays.

Suitable relays come with AC and DC coils. A suitable, yet still exemplary relay is the TE Connectivity (Schaffhausen, Switzerland) RT314615, which is a relay with an 115V AC coil and SPDT contacts rated at 16 A. The coil in this relay can be controlled from a low-voltage logic signal by using the Lite-On MOC3023 optically-isolated TRIAC driver. A relay with a low-voltage DC coil can also be used, but this significantly increases the current drain on the RCD supply, requiring C1 and C2 to increase in value, R4 to decrease in value to avoid excessive heat dissipation, and increasing the zener voltage of D2 to 24V. The DC relay is cheaper, but it requires a redesign of the power supply, resulting in more expensive components in other places. If a DC relay is selected, a TE Connectivity 1-1415899-7 (RZ03-1A4-D024) relay could be used. This relay has SPST contacts rated at 16 A. The 24V DC coil has a resistance of 1440 ohms.

One aspect of the devices and methods described herein includes enabling pairing by simply placing the receiver in close proximity to the transmitter, e.g. plugging the two together. FIG. 13 illustrates four exemplary embodiments of proximity pairing. For this operation to work reliably, two conditions should be met:

A receiver must always pair to the transmitter into which the user has connected it; and A receiver must never pair to an unintended transmitter, such as a second transmitter that the user or their neighbor happens to have located nearby.

Since there is no practical way to detect when two devices are actually plugged together, the inventors herein devised numerous types of proximity sensing to tell the transmitter that it's in very close proximity to a receiver and that it's therefore acceptable to enable pairing. (While the instructions provided to a user may simply instruct to plug the receiver into the transmitter, the system operation would actually be detecting nearby proximity.) One embodiment, schematically illustrated in FIG. 13b, includes a user-activated pairing button 200, which could be used in lieu of proximity sensing, although that embodiment is somewhat less preferred. Instead, adding a proximity-based or user-activated pairing step means the receiver only accepts pairing messages for a very small amount of time, and the likelihood of mispairing (i.e., pairing to an unintended transmitter, such as a transmitter in an adjoining apartment) is greatly reduced.

Figure 13A:
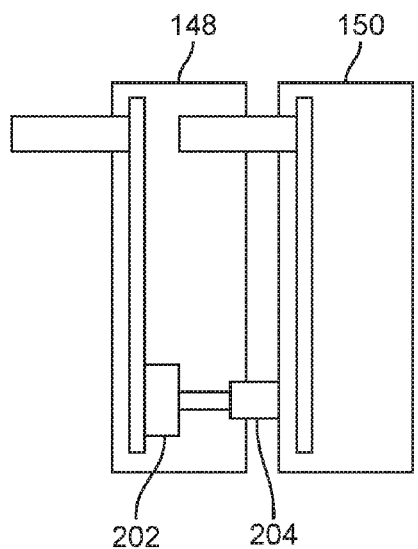
FIG. 13 illustrates four embodiments of proximity sensing.
Figure 13B:
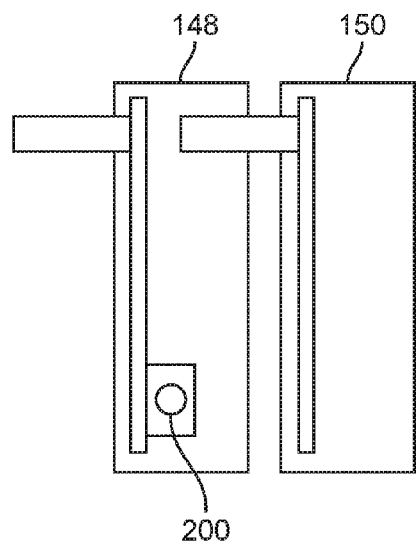

Three types of proximity sensing can be incorporated. The simplest is a pushbutton switch 202, recessed in the housing of the transmitter 148, that gets activated by a 'button activator' 204 extending from the receiver whenever the receiver is plugged into the transmitter, an example of which is illustrated in FIG. 13a. Such a switch could be soldered directly to the PCB of the transmitter 148, and activated by a 'button activator' mechanical feature (e.g., finger) 204 on the receiver 150 when the two devices are plugged into each other; further optionally, the activator 204 can be hinged to the transmitter 148 and located in a recess therein, and thus deployable when used to depress switch 202, and otherwise stored away. A variant of this approach is where the button is user-activated, rather than activated by a portion of the Receiver engaging the button (FIG. 13b).

Figure 13C:
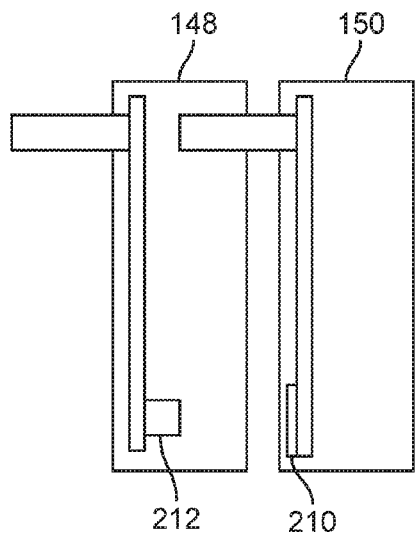

The second proximity detection method that could be used is magnet-based (see FIG. 13c). In this approach, a magnet 210 would be embedded in the housing of each receiver 150, and the transmitter 148 would sense the magnetic field of the magnet 210 with a Hall Effect sensor 212, which is in communication with the circuits of the transmitter. Depending on the separation distance from magnet 210, a larger, more expensive magnet may be needed.

Figure 13D:
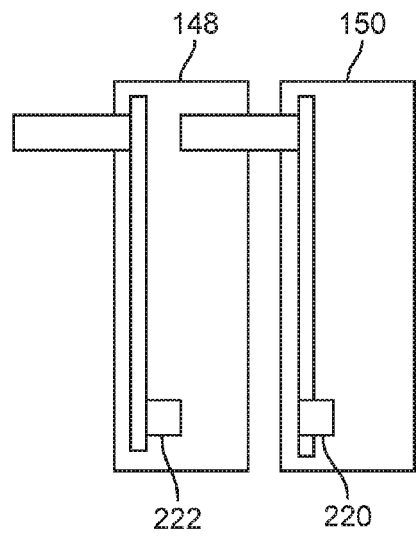

Finally, a method using infrared (IR) light can be used (FIG. 13d). In this approach, the receiver 150 would be fitted with an IR emitter 220, and the transmitter 148 would have an IR sensor 222. When the receiver 150 is plugged into the transmitter 148, light from the IR emitter 220 would illuminate the IR detector, putting the transmitter into a pairing mode. The material (e.g., plastic) used for the housings of the receiver and transmitter is assumed to be IR-transparent, or a window of IR transparent material is formed in the housing so that an IR signal can pass through the housing to the IR sensor. The wireless switch 146 may not need a proximity sensor, because it already has a button, and by pressing and holding the button for a several seconds, the transmitter and wireless switch could enter the pairing mode. A magnet could also be used, at a higher cost.

A microcontroller is required in both the receiver and transmitter. Microcontrollers are also available with an integral radio function. This design option is referred to as a System on Chip (SoC). Use of a SoC sometimes results in development cost savings, lower BOM cost, and smaller PCB area. Several low-cost SoCs can be used, and alternatively discrete (separate radio and microcontroller chips) designs can be used instead. A Texas Instruments MSP430G2402IPW14R microcontroller is a cost effective choice for this function in the receiver and transmitter. For the wireless switch, a TI MSP430G2432IPW14R, which is nearly identical but includes an analog-to-digital converter which is needed for the battery test function, can advantageously be used. The Texas Instruments CC115LRGPR RF transmitter IC is suitable for the transmitter unit, although others can be used.

For the RF receiver, a Texas Instruments CC113LRGPR RF receiver IC is suitable. It is a good match to the selected transmitter IC, covering the same frequency ranges and data rates, and has RF sensitivity of −104 dBm when operated at 38.4 kbps.

For the RF transceiver, a Texas Instruments CC110LRGPR RF transceiver IC is suitable for use in the wireless switch. It combines the functionality of the CC113L receiver and CC115L transmitter.

An internal antenna (either a copper trace on the PCB, or an appropriately sized wire soldered to the PCB) is advantageously used for all three devices (transmitter, receiver and wireless switch), although an external antenna can certainly be used.

A battery is not required for either the transmitter or the receiver, as discussed elsewhere herein. The wireless switch requires a battery, because it is not connected to the AC mains. The wireless switch will have a very low duty cycle for transmission, which should result in years of usage before the batteries need to be replaced, or recharged. A battery test circuit can optionally be provided which will allow its microcontroller to determine that a low-battery condition exists. The battery test circuit, along with the microcontroller firmware, preferably provides hysteresis so that once the low-battery threshold is crossed, the unit will stop transmitting until the battery voltage rises above a higher "good" battery threshold. When the battery is low, the microcontroller should also not blink the LED during button presses, and this is another indication to the user to replace or recharge the batteries.

Use of an identical Printed Circuit Board for both the transmitter and receiver is possible. Using this approach could allow development cost savings because only one PCB needs to be designed. However, since there are significant differences in functionality between the transmitter and receiver, different components would have to be put on the PCBs. So, even if the bare PCBs were identical, there would have to be two different PCB assemblies.

Operation

In the basic two-way system (transmitter and receiver shown in FIGS. 8 and 9), the transmitter is powered only when its switched outlet is powered. This is important to avoid the need to include rechargeable batteries, which add cost, complexity, and have lifetime and safety issues. When the switched outlet is energized, the transmitter 148 powers up quickly and transmits an "on" message, along with its unique ID code. This message is received by all paired receivers 150, 150', which then activate their load switches. When the switched outlet is switched off by the user, the transmitter 148 detects the cessation of AC power by the lack of pulses from the 60 Hz Pulse circuit, and it sends an "off" message to all paired receivers 150, 150'. C2 in the RCD power supply is large enough to maintain power for enough time to transmit this message by the transmitter 148. Depending on the exact design of the RF Protocol, the transmitter 148 can also be designed to continue transmitting "on" messages at fixed intervals whenever its outlet is powered. In this case, if the receiver 150 misses the "off" message for whatever reason, the lack of periodic "on" messages will cause the receiver to deduce an "off" condition at the transmitter 148.

Figure 9:
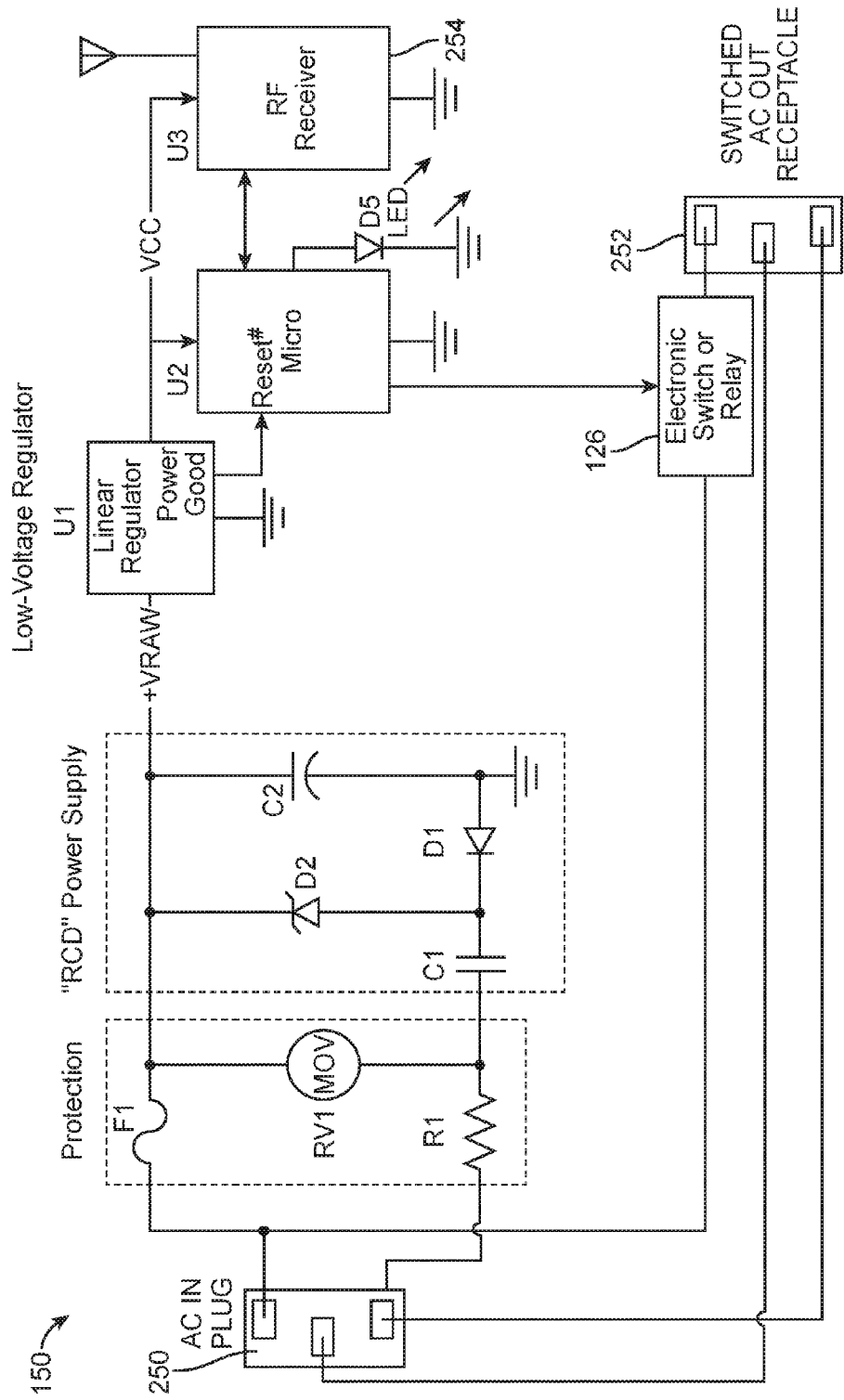
FIG. 9 illustrates an embodiment of a receiver circuit.
Figure 10:
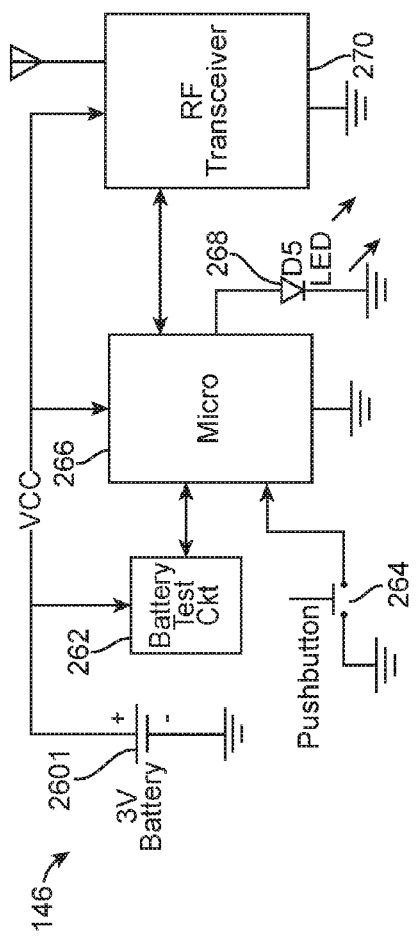
FIG. 10 illustrates an embodiment of a wireless remote circuit.

In the three-way system implemented using the transmitter 148 of FIG. 8, the receiver 150 of FIG. 9, and the wireless switch 146 of FIG. 10, then the operation is the same as described above, except that a second RF link is used to send button-press messages to the receiver. Pressing the button on the wireless remote 146 once would cause the message "invert the state sent by the transmitter" to be sent to all paired receivers 150, 150'. Pressing the button again would cause the message "don't invert the state sent by the transmitter" to be sent to all paired receivers. The receiver, receiving both these messages and the "on" and "off" messages from the transmitter, would take appropriate action to control its load switch.

One scenario that must be handled properly is the case where a wireless switch 146 is removed from the system for whatever reason (damaged, battery is low/dead, or the user removes it from the premises). With the wireless switch 146 gone or otherwise out of range, it is possible for the receiver 150 to remain forever in the opposite state from the transmitter 148. This in itself is not so terrible, unless there is another lamp plugged directly into the switched outlet: the two lights would never be in sync with each other. To address this concern, the wireless switch 146 can be encoded to periodically transmit the state inversion message (either "invert the transmitter state" or "don't invert the transmitter state"). Persistent lack of receiving this message at the receiver 150 would cause it to revert to two-way system operation. In this case, the receiver 150 would sync to the state of the transmitter 148 at the time of the next transmitter transition.

In the two-way system, the transmitter 148 and receiver 150 must be electronically paired, or otherwise associated with each other. This is required to avoid getting the receiver 150 confused by other transmitters, which could be located in a nearby room or even in another apartment in the same building. The receiver 150 will thus ignore all RF messages from non-paired transmitters.

In the three-way system using the wireless switch 146, the receiver 150 will receive RF messages from both the wireless switch 146 and the transmitter 148. The wireless switch 146, like the receiver 150, must be paired with one, and only one, transmitter 148. Once paired, the wireless switch 146, whenever activated, transmits the same unique ID code as used by the transmitter 148, but its RF messages will be INVERT or DON'T INVERT, rather than ON or OFF. This functionality requires an RF transceiver (transmitter and receiver) in the wireless switch 146, and this is shown in FIG. 10. The receiver 150 and wireless switch 146 both need to store the transmitter's unique ID code in nonvolatile memory (i.e., flash memory). Maintaining this code in non-volatile memory is crucial, since pairing will usually be done only once by the user (or at the factory), and it would be very inconvenient for the user to repeat the pairing process after every power failure.

Pairing the transmitter and receiver is accomplished by plugging the transmitter into a live outlet and then plugging the receiver into the transmitter (or by first plugging the transmitter and receiver together, and then plugging into a live AC outlet). A proximity sensor in the transmitter (discussed elsewhere herein) is triggered by the nearby receiver, putting the transmitter into the pairing mode. When in the pairing mode, the transmitter will transmit a special pairing message that includes its unique ID code. The LEDs on the units will optionally blink when pairing is underway. Creating visual indication from the LEDs can be important in case the user attempts pairing at an unpowered switched outlet (which obviously will fail). When in pairing mode, the transmitter can advantageously operate at a low RF power to reduce the chance of causing RF overload to the nearby receiver. If multiple receivers are paired to the same transmitter, the procedure above must be repeated with each receiver.

Pairing a wireless switch to a transmitter follows a similar process. The user must plug the transmitter into a live outlet, locate the wireless switch near the transmitter, and then push and hold the button on the wireless switch. LEDs on both units optionally will blink to indicate that pairing is underway. Once a wireless switch is paired to a transmitter, all the receivers paired to that transmitter will respond to messages from the wireless switch.

Pairing can be un-done by re-pairing the receiver or wireless switch to a new transmitter. The transmitter's ID code stored in the memory of the receiver or wireless switch will be replaced by the ID code of the new transmitter.

An alternative method of pairing eliminates the proximity sensor altogether. Instead, the RSSI (received signal strength indicator) at the receiver 150 is examined for every received message (even a message from a non-paired transmitter). If the RSSI is very high, indicating very close proximity to the transmitter 148, the receiver 150 pairs with the transmitter and saves its ID code in non-volatile memory. This method of pairing can work with both the transmitter 148 and the wireless switch 146. This method of pairing results in the lowest cost but requires more firmware effort to implement. A major concern with this method is the possibility of mis-pairing or inadvertent pairing if the user has several nearby transmitters.

Although probably not needed for acceptable performance in most uses, immunity to interference and wireless range could be improved by use of frequency diversity. This technique would add a feature whereby the transmitter repeats its transmissions on multiple RF channels in its band (e.g., 900 MHz band). This is an effective hedge against interference because, although one of the RF channels may get blocked, it is very unlikely that all of the channels would be blocked. Thus, the system can be made to operate normally even if there is RF interference on a channel. One drawback with frequency diversity is that it will add to system latency, slowing the response to on and off transitions.

Turning back to FIGS. 8-10, and with more specific reference thereto, exemplary circuits are illustrated. In the exemplary circuit of FIG. 8, a low-voltage regulator U1 receives VRAW from the RCD power supply, and outputs VCC and a power-good signal. A 60 hz pulse circuit 236 is also in communication with the RCD power supply, as illustrated, and includes a resistor R2 and a pair of Schottky diodes D3, D4; the output of D3 is VCC micro, while the output of D4 is fed to a microcontroller U2, described elsewhere herein. A proximity sensor/pairing button, described elsewhere herein, is also connected to an input of the microcontroller U2. The VCC output of the low-voltage regulator U1 is input to the microcontroller U2, which is in signal communication with the RF transmitter 240; as also described elsewhere herein, an LED is advantageously in communication with an output of the microcontroller U2.

With reference to FIG. 9, in an exemplary circuit for a receiver 150, VRAW from the RCD power supply is output to a low-voltage regulator U1, which outputs a good power signal to the microprocessor U2, as well as VCC to both the microcontroller and the RF Receiver U3. The microcontroller U2 outputs to an LED D5, as well as the electronic switch or relay 126, as described elsewhere herein. The relay 126 controls voltage between an AC input plug 250 to the (switched) AC outlet receptacle 252. The microcontroller U2 is in signal communication with the RF receiver 254, as discussed elsewhere herein.

With reference to FIG. 10, in an exemplary circuit for a wireless remote 146, a battery 260 provides VCC to both a battery test circuit 262, a microcontroller 266 (discussed elsewhere herein), and a RF transceiver 270 (also discussed elsewhere herein). The microcontroller 266 is in signal communication with both the battery test circuit 262 and the RF transceiver 270, as well as the aforementioned pushbutton 264 being connected to an input of the microcontroller, and an LED 268 to an output.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A system useful for remotely controlling an alternating current across at least two electrical terminals, the system comprising:
   a transmitting unit including
      an alternating current detector configured to be electrically connected to a source of alternating current, the alternating current detector including a signal output;
      a controller having
         an external interrupt in communication with the signal output of the alternating current detector, and
         a data output,
         wherein the controller is configured to determine a duty cycle of a signal from said signal output of the alternating current detector and generate a signal representative thereof to said data output, and
      an RF transmitter in communication with the controller data output, the RF transmitter being configured to wirelessly transmit data representative of the signal representative of the duty cycle; and
   a receiving unit including
      an electrical connector inlet configured to be connected to a wall outlet of alternating current,
      an alternating current control in electrical communication with said electrical connector inlet and including a signal inlet and at least one pole of a controlled alternating current outlet,
      a controller having a control signal output in signal communication with the alternating current control signal inlet, the controller including a data inlet;
      an RF receiver having an outlet in signal communication with the controller data inlet, the RF receiver configured to receive data from the RF transmitter representative of duty cycle,
      wherein the controller is configured to generate a signal representative of duty cycle data received from the RF receiver, and to output said signal to said controller control signal output, and
      wherein the alternating current control is configured to change the duty cycle of alternating current across said electrical connector outlet based on the signal at said signal inlet from said controller.

2. A system according to claim 1, wherein:
   the receiving unit further comprises
      a manually-operable wireless remote;
      an RF transmitter in signal communication with the manually-operable wireless remote, the receiving unit RF transmitter being configured to wirelessly transmit data when said manually-operable wireless remote has been actuated; and
   the transmitting unit further comprises
      an RF receiver in signal communication with the receiving unit RF transmitter, the transmitting unit RF receiver being configured to communicate with said controller upon receipt of data representative that said manually-operable wireless remote has been actuated.

3. A system according to claim 1, wherein the transmitting unit and the receiving unit together include a proximity sensing system configured and arranged to determine when the receiving unit is immediately adjacent to the transmitting unit.

4. A system according to claim 3, wherein the proximity sensing system comprises:
   a pushbutton recessed in the transmitting unit; and
   a finger that extends from the receiving unit, sized to extend into the transmitting unit and into contact with the pushbutton.

5. A system according to claim 3, wherein the proximity sensing system comprises:
   a hall sensor in the transmitter unit; and
   a magnet in the receiver unit.

6. A system according to claim 3, wherein the proximity sensing system comprises:
   an infrared sensor and an infrared-transparent portion in the transmitter unit; and
   an infrared emitter in the receiver unit.

7. A system according to claim 3, wherein the proximity sensing system is in signal communication with the controller.

8. A system according to claim 7, wherein the transmitter unit controller is further configured to generate a pairing data signal at said data output when said proximity sensing system indicates that said receiver unit is in close proximity to said transmitter unit.

9. A system according to claim 8, wherein:
   the transmitter unit RF transmitter is configured to wirelessly transmit data representative of pairing data when said transmitter unit controller generates a pairing data signal;

the receiver unit RF receiver is configured to wirelessly receive said data representative of pairing data from said transmitter unit RF transmitter, and generate a pairing data signal; and the receiver unit controller is further configured to receive and register said pairing data signal from the receiver unit RF receiver.

10. A system according to claim 9, wherein the receiver unit controller is further configured to control the alternating current control only when said transmitter unit transmits a pairing data signal the same as a registered pairing data signal.

* * * * *